(12) United States Patent
Wankmueller

(10) Patent No.: US 7,039,809 B1
(45) Date of Patent: May 2, 2006

(54) ASYMMETRIC ENCRYPTED PIN

(75) Inventor: John Wankmueller, New Hyde Park, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 09/321,977

(22) Filed: May 28, 1999

Related U.S. Application Data

(60) Provisional application No. 60/108,090, filed on Nov. 12, 1998.

(51) Int. Cl.
*H04L 9/32* (2006.01)
*H04K 1/00* (2006.01)

(52) U.S. Cl. ................ 713/182; 713/181; 726/3; 705/72; 705/75

(58) Field of Classification Search ............. 713/172, 713/181, 182, 185, 200–202; 705/64, 65, 705/71, 72, 75

See application file for complete search history.

(56) References Cited

U.S. PATENT DOCUMENTS 4,997,288 A * 3/1991 Rosenow ............... 380/2

(Continued)

OTHER PUBLICATIONS

McKinsey, "Protection of Intellectual Property, Law or Technology?" 1997, pleasurepoint.com/~jay/papers/tech_law.html, p. 1-7.*

(Continued)

*Primary Examiner*—Christopher Revak
(74) *Attorney, Agent, or Firm*—Baker Botts LLP; Manu J. Tejwani

(57) ABSTRACT

Secure protection and distribution of a personal identification number (PIN) is achieved by using a first encryption process only for PIN data and a second encryption process for non-PIN data. The first encryption process uses asymmetric encryption, where a public key is used for encryption of PIN data and a private key, held only by an authorizing agent, is used to decrypt the PIN data. The second encryption process uses a key which is available to an authentication requestor, such as merchants. A party seeking authentication of PIN data must forward the encrypted PIN data to an authorizing agent along with account data necessary to validate the PIN data. The authentication requestor is provided with a signal which is indicative of the verification status of the PIN data without being privy to the contents of the PIN data.

18 Claims, 5 Drawing Sheets

U.S. PATENT DOCUMENTS

| | | | | |
|---|---|---|---|---|
| 5,022,076 | A | * | 6/1991 | Rosenow et al. ............... 380/2 |
| 5,175,766 | A | * | 12/1992 | Hamilton ..................... 705/71 |
| 5,319,710 | A | * | 6/1994 | Atalla et al. .................. 705/75 |
| 5,371,797 | A | * | 12/1994 | Bocinsky, Jr. ............... 705/70 |
| 5,448,638 | A | * | 9/1995 | Johnson et al. ............... 705/72 |
| 5,724,424 | A | | 3/1998 | Gifford |
| 5,915,023 | A | * | 6/1999 | Bernstein ..................... 705/75 |
| 5,999,624 | A | * | 12/1999 | Hopkins ...................... 705/70 |
| 6,012,144 | A | * | 1/2000 | Pickett ....................... 713/201 |
| 6,014,745 | A | * | 1/2000 | Ashe .......................... 713/193 |
| 6,092,202 | A | * | 7/2000 | Veil et al. ................... 713/201 |
| 6,571,337 | B1 | * | 5/2003 | Xiao .......................... 713/194 |

OTHER PUBLICATIONS

Stockel, "Securing Data and Financial Transactions" 1995, IEEE, p. 397-401.*

"Programming a Distributed Application The Tuxedo System Approach" 1996, Novell, p. 1-17.*

Warwick Ford, et al., "Secure Electronic Commerce: Building the Infrastructure for Digital Signatures and Encryption," © 1997 Prentice Hall PTR, pp. 93-142, 413-15.

D.W. Davies et al., "Security for Computer Networks", 1984 A Wiley-Interscience Publication, pp. 119-144 and 290-344.

* cited by examiner

ASYMMETRIC ENCRYPTED PIN

CROSS REFERENCE TO RELATED APPLICATIONS

This application claims priority to U.S. Provisional patent application entitled "Asymmetric Encrypted Pin," Ser. No. 60/108,090, which was filed on Nov. 12, 1998.

FIELD OF THE INVENTION

The present invention relates generally to secure electronic transactions, and more particularly relates to systems and methods for encoding transaction data were a personal identification number (PIN) is encrypted separately from other financial account or transaction data.

BACKGROUND OF THE INVENTION

Electronic commerce (e-commerce) is growing at an incredible rate. With the ever expanding popularity of electronic networks such as the Internet, companies and individuals are seeking ways to efficiently use such networks as a medium for conducting business. While e-commerce is steadily growing in popularity, a potential impediment to realizing electronic commerce's full potential resides in a perception that financial information which is required to perform a transaction, such as credit card account data and debit card personal identification numbers and the like, is subject to interception and misuse by unauthorized third parties when transmitted over an open network such as the Internet.

In general, to process payment information over a network, a personal identification number ("PIN") can be used to verify that the sender of payment information is the person or entity authorized to use the payment information. For example, if a customer is using a debit card or other electronic account access to purchase goods and services on the Internet, the payment information will include a PIN which will be checked by the debit card issuer processing center. While using a credit card over a network currently does not typically involve the use of a PIN, the verification technique of a PIN could be used with credit cards or electronic cash cards. If the PIN is valid, the transaction will proceed pending other verifications. If the PIN is invalid, the customer will be asked to retransmit the payment information with the correct PIN. If the correct PIN is not entered after a predetermined number of times, the transaction will be denied.

As the PIN prevents the unauthorized use of the card or account information in the case of a lost or stolen card, PIN information must be treated very securely in typical debit transactions, automatic teller machine ("ATM") transactions and any transactions over a network which include transmitting electronic transaction information such as account numbers. If the payment information is being transmitted over an open network such as the Internet, it must be sent in a secure manner. Additionally, if the PIN information is being sent to a merchant for processing, the merchant must be able to know the PIN is valid without actually being able to obtain or view the PIN information. Otherwise, fraudulent use of a customer's PIN by unscrupulous merchants or employees may result.

A number of encryption/decryption techniques are available for encoding a PIN number and other data prior to network transmission. There are two basic types of encryption; symmetric encryption and asymmetric encryption. Symmetric encryption uses a secret key as part of a mathematical formula which encrypts data by transforming the data using the formula and key. After the data is encrypted, another party can decrypt the data using the same secret key with a related decryption algorithm. Because the same key is used for both encryption and decryption, the technique is said to be symmetric. A conventional example of a symmetric encryption algorithm is the NIST Data Encryption Standard (DES).

Asymmetric encryption techniques use two different keys as a pair for encrypting and decrypting information. The two keys are normally referred to as a private (or secret) key and a public key. When data is encrypted with one key of the pair, the other key is used to decrypt the data. For example, if a sender of data signs the data with his secret key, anyone with the public key can verify the message. Since public keys are typically known to the public, the contents of a data signed with a secret key cannot be protected. However, the origination of the data can be verified by determining if a particular secret key was used to "sign" the data. This authentication process is termed a digital signature.

The asymmetric key set can also be used to protect the contents of a message. If person A wants to send an encrypted message to person B that no one else can read, the sender encrypts the data or message with person B's public key and sends it to person B. Now, only the holder of B's secret key is able to decrypt the data. If a combination of keys is used, a person could both authenticate and encrypt the message. The use of an asymmetric pair of keys is more robust than symmetrical encryption, making it desirable for use in financial transactions. However, asymmetric encryption is mathematically intense and requires significantly more processing resources than symmetric encryption. This characteristic tends to either limit the application of asymmetric encryption to small blocks of data, subject the system to significant, undesirable processing overhead, or require special dedicated encryption hardware to perform efficiently. A popular example of an asymmetric encryption method is the Rivest-Shamir-Adelman (RSA) cryptography method, by RSA Data Security Inc., Redwood City, Calif. However, all references to RSA in this document are meant in a generic way to broadly encompass all asymmetric encryption methodology, not just the RSA algorithm.

A form of symmetric encryption which makes this encryption method more powerful is to encrypt data using multiple keys. This technique, called triple DES, first encodes data with symmetric key A, then decodes the data using symmetric key B (which in effect further encodes the data) and then further encodes the data using key A again. Once the data has arrived at its destination, key A is used to decode the data, key B is used to encode the data, and key A is used to decode the data. These extra steps of encoding and decoding make the technique more powerful and more difficult to properly decipher without both keys.

In order to effect secure electronic transactions, a communications protocol is required between the requestor of account verification and the issuer of the account. The Secure Electronic Transaction ("SE™") protocol is an exemplary protocol which is used to transmit credit card payment information in a secure manner. It would be beneficial if electronic transaction protocols included the ability to securely encrypt the PIN data in such a manner that only PIN verification centers would have access to the unencoded PIN data.

Payment protocols can use a variety of encryption techniques to secure messages. In one scheme, most of the transmitted data is encrypted using DES or a similar symmetric encryption scheme. In order to provide the key to the receiver of the message, the DES key used to encrypt the information is included in the message and is separately encrypted using the stronger asymmetric encryption such as RSA. In addition to the DES key being asymmetrically encrypted, the primary account number ("PAN") and other possible data are also asymmetrically encrypted. The receiver of the information can provide its public RSA key to the sender so that the DES key and account information can be encrypted with that key. The receiver then will be the only entity able to decrypt the DES key and account information because the receiver is the only entity which has the corresponding private key. In the case of a merchant receiving the payment information from a customer inside the message, it would be beneficial to prevent the merchant from decrypting certain information which would need to be only analyzed by a financial institution which processes the payment information. The merchant does not require viewing the account data and PIN itself but will rely on the financial institution to process that data. Other order information, such as product identification, would be documented and processed by the merchant.

SUMMARY OF THE INVENTION

It is an object of the present invention to enhance secure electronic transactions by providing a method of encrypting a PIN of an account holder in a manner which is both secure and efficient.

It is a further object of the present invention to provide a method of encrypting a PIN of an account holder in a manner that separates the PIN and PIN-related data from the remaining associated account information.

It is another object of the present invention to provide a secure method of transmitting account access data over an open computer network.

In accordance with the present invention, a first method for performing a secure electronic transaction which involves account PIN data and non-PIN data includes the step of performing a first encryption operation only on the PIN data. A second encryption operation is then performed at least on the non-PIN data. Preferably, the first encryption operation employs an asymmetrical encryption process, whereas the second encryption operation uses a symmetrical encryption process.

A further method for performing a secure electronic transaction in accordance with the present invention includes the step of evaluating transaction data to identify PIN-related data blocks and non-PIN data blocks. A first encryption operation is then performed only on the PIN-related data blocks and a second encryption operation is performed at least on the non-PIN data blocks. The first encryption operation is not performed on the non-PIN data blocks, thereby maintaining secure separation between these data types. Preferably, the first encryption operation uses an asymmetrical encryption process for enhanced security, whereas the second encryption operation uses a symmetrical encryption process for higher speed and computational efficiency.

A system for encoding and transporting PIN and non-PIN data according to the present invention includes first means for encrypting only the PIN data using a first encryption process and second means for encrypting at least the non-PIN data using a second encryption process, wherein the second encryption process is different from the first encryption process. The system further includes means for transmitting the encrypted PIN and non-PIN data to an authentication requestor which has associated means to decrypt only the non-PIN data. Also included are means for retransmitting, by the authentication requestor, the encrypted PIN data to an authorizing agent for verification as well as means for decrypting and verifying the PIN data by the authorizing agent. Further means are provided for notifying the authentication requestor of a verification status of the PIN data.

Preferably, the first encryption means employs an asymmetrical encryption process, whereas the second encryption means employs a symmetrical encryption process. In the preferred embodiment, the first encryption means uses a public key provided to an account holder by the authorizing agent and the decrypting means uses a private key, held only by the authorizing agent, which is associated with the public key.

BRIEF DESCRIPTION OF THE DRAWING

Further objects, features and advantages of the invention will become apparent from the following detailed description taken in conjunction with the accompanying figures showing illustrative embodiments of the invention, in which.

Figure 1A:
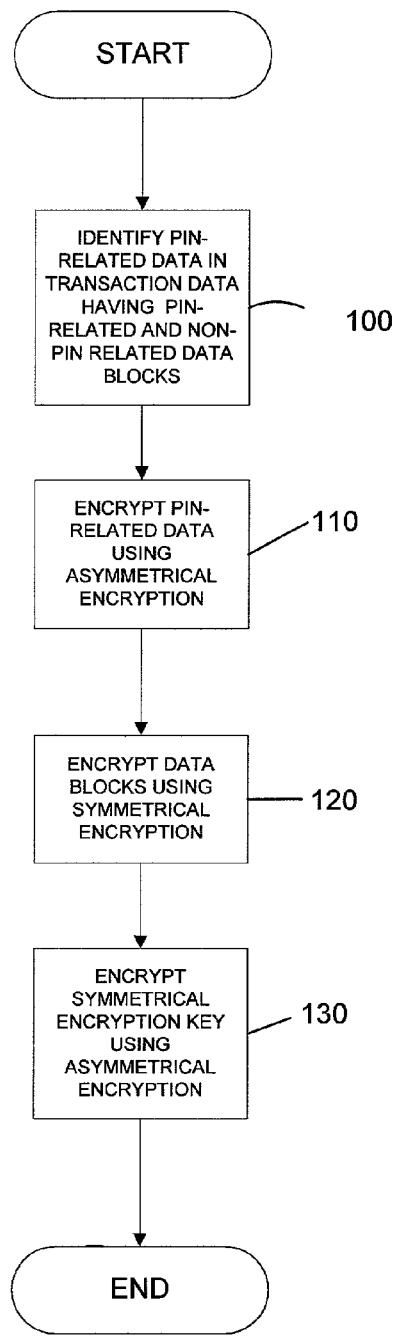
FIG. 1A is a flow chart illustrating a method of encrypting a personal identification number to facilitate a secure electronic transaction in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF PREFERRED EMBODIMENTS

In systems and methods for conducting secure electronic transactions, various data is exchanged between a customer, a merchant and a payment center. Included in this data is financial data related to an account from which funds will be drawn to pay for the transaction. The data includes account related information as well as PIN related data. To maintain the security of the account, it is advantageous to separately encrypt the PIN related data for any other account data.

The present invention relates to a multi-tiered encryption method which separately encrypts PIN and PIN-related data (hereinafter all PIN and PIN related data is referred to as "PIN data blocks") in a separate manner than the remaining account data and other transaction data. PIN related data can include a PIN offset for encryption purposes, information linked to the PIN or other related data. The term PIN in this application includes numeric, alphanumeric and other combinations of characters which serve to verify the owner or authorized user of financial information such as a credit/debit card account.

FIG. 1A is a flow chart illustrating a method, for encrypting a personal identification number to facilitate a secure electronic transaction in accordance with the present invention. Referring to FIG. 1A, transaction data is first analyzed to identify PIN data blocks and non-PIN related data blocks (step 100). Non-PIN related data blocks include such information as the PAN (primary account number), expiration date and other account information as well as information specific to the requested transaction, such as the dollar amount of the requested transaction. PIN data blocks include the account holder's PIN as well as PIN offset data. PIN offset data and non-PIN related account data can be acquired from the magnetic strip of a standard credit/debit card, from the memory of an integrated circuit card (e.g., "smart card") or other computer memory such as in a personal computer, or by manual entry via a keyboard or other input device by an authorized user of the account in a manner well known in the art of credit/debit card systems. The PIN can be input manually by an authorized user of the account.

After PIN data is identified in step 100, a first encryption process is performed exclusively on the PIN data blocks (step 110). Because of the sensitive nature of the PIN data blocks, an asymmetrical encryption process is preferably employed for the first encryption process. A well-suited asymmetrical encryption processes is the RSA encryption process. The PIN data is preferably processed only by the appropriate financial institution, approved by an organization such as MasterCard®. Although the merchant will receive the encrypted PIN data, it will not decrypt the PIN data but instead will forward the information to the financial institutions for verification.

Figure 2A:
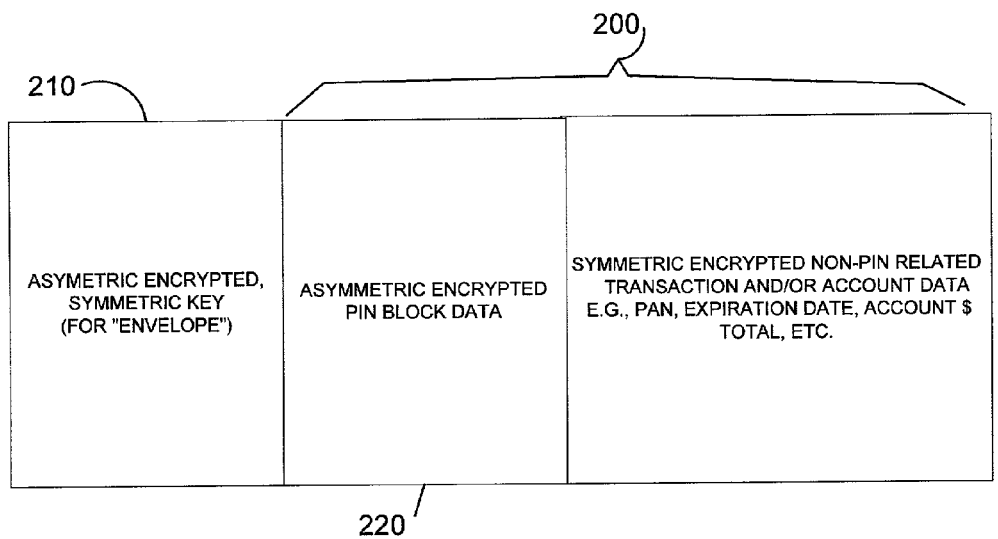
FIG. 2A is a block diagram schematically illustrating an encrypted data structure resulting from a method in accordance with the present invention.

Next, a second encryption process is preferably applied to all involved data blocks, including the previously encrypted PIN data blocks (step 120). In order to efficiently encrypt/decrypt the data blocks during the second encryption process, this process is preferably performed using a relatively high speed, symmetrical encryption process, such as DES. However, as computers become more powerful and encryption algorithms become more efficient, asymmetric encryption can be used for the second encryption process as well. If the previously encrypted PIN data blocks are encrypted along with the other data blocks during the second encryption process, the encrypted PIN data blocks 220 will reside within an encrypted envelope 200, as shown in FIGS. 2A and 2C. However, whether or not the PIN data blocks 220 are further encrypted using the second encryption process (step 120), the result of the second encryption process (step 120) is that the encrypted PIN data blocks 220 are cryptographically isolated from the remaining account and transaction data, i.e., a separate cryptographic key is required to decrypt the encrypted PIN data blocks.

If a symmetrical encryption process is employed for the second encryption process, it is desirable to append the required encryption key to the encrypted envelope 200 such that an authorized recipient can decode the encrypted data. In this case, a third encryption process, which is preferably asymmetric (such as RSA), is used to encrypt the key used for the second encryption process (step 130). The encrypted symmetric key 210 resides outside the encrypted envelope 200, as shown in FIGS. 2A through 2C.

While the first and third encryption processes (steps 110, 130) are both asymmetrical, they can employ the same or different encryption keys. The use of a common key for these steps simplifies key distribution and management, but offers a reduced level of security.

An important advantage of this invention for the transmission of PIN data is the separation and different cryptographic treatment of PIN data blocks from non-PIN-related items. In the preferred embodiment of the present invention, only the PIN data blocks are initially encrypted using RSA or other asymmetric encryption techniques. Then, the encrypted PIN data blocks 220 are further encrypted, along with the remaining transaction and account data, by symmetrical encryption, such as DES. The subsequent encryption step effectively forms an encrypted envelope 200 for the data. Accordingly, the PIN data blocks are cryptographically isolated within encrypted sub-envelope 220 which resides within encrypted envelope 200. Thus, there is no mix or direct placement of the PAN or other account information within the asymmetric encrypted PIN data blocks 220. RSA encrypted-PIN data blocks and the PAN without explicitly including the PAN in the PIN data block itself. In this way, there is a secure separation of PIN data from non-PIN data.

Figure 2B:
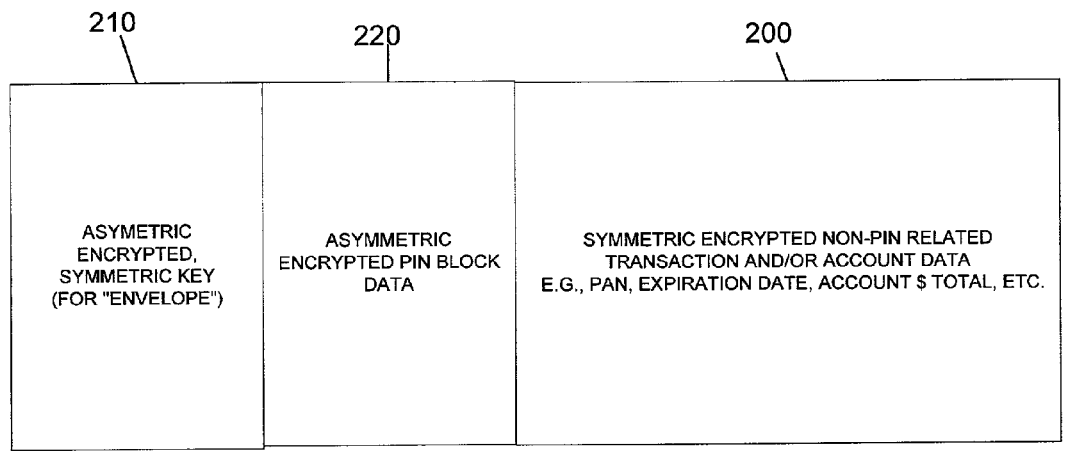
FIG. 2B is a block diagram schematically illustrating an encrypted data structure resulting from an alternate method in accordance with the present invention.
Figure 2C:
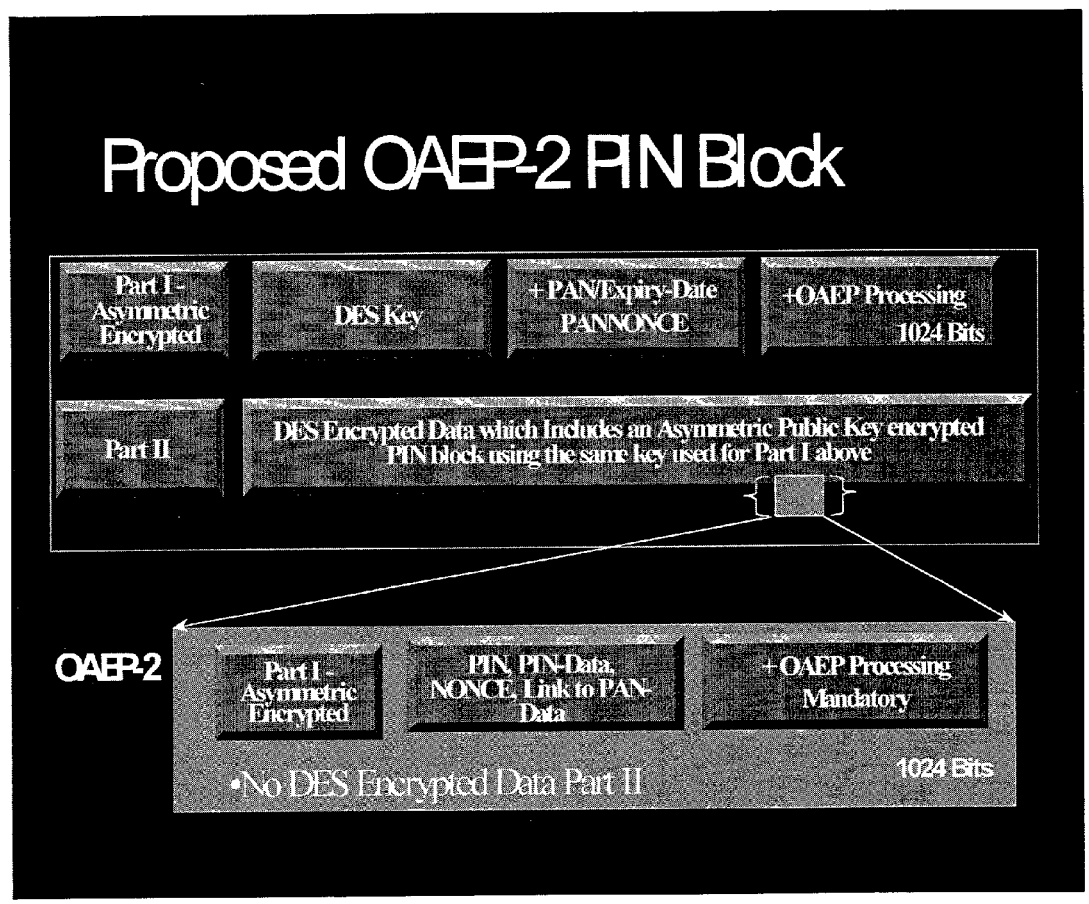
FIG. 2C is a block diagram schematically illustrating an encrypted data structure resulting from an alternate method in accordance with the present invention.

In an alternate embodiment, the encrypted PIN data blocks 220 need not be further encrypted by step 120, as illustrated in FIG. 2B. This allows simple and direct RSA encryption of PIN data blocks to form an encrypted PIN block 220 outside of envelope 200. Again, to make the PIN information more secure, the account information (PAN) is cryptographically isolated from the encrypted PIN data by different encryption keys and/or techniques. In order to match the PIN data to the associated PAN data, the PAN, and preferably a unique transaction identifier, are preferably subjected to a one-way mathematical function (i.e., a hash algorithm) to create a digest which is included with the encrypted PIN information. The financial institution receiving the encrypted PIN and account information from the consumer can recalculate the digest based on the received PAN data and optional transaction identification using the same one-way mathematical formula and then compare the calculated digest against the digest which was received with the PIN and PAN data (step 180). If the digests match, the financial institution knows that the encrypted data belongs with the PAN data and that the PAN data was not tampered with or otherwise corrupted.

In either option (FIG. 2A or 2B), all asymmetric or RSA encryption operations on the PIN data block preferably employ the OAEP blinding technique. The OAEP protocol and blinding technique is described in the SET V 1.0, Book 3, (Formal Protocol Definition) which is hereby incorporated by reference. FIG. 2C illustrates a more specific data structure resulting from the operation of the present invention when used in conjunction with the SET protocol and employing OAEP. As with FIG. 2A, the encrypted PIN block resides within an encrypted DES envelope apart from the remaining account data.

Figure 1B:
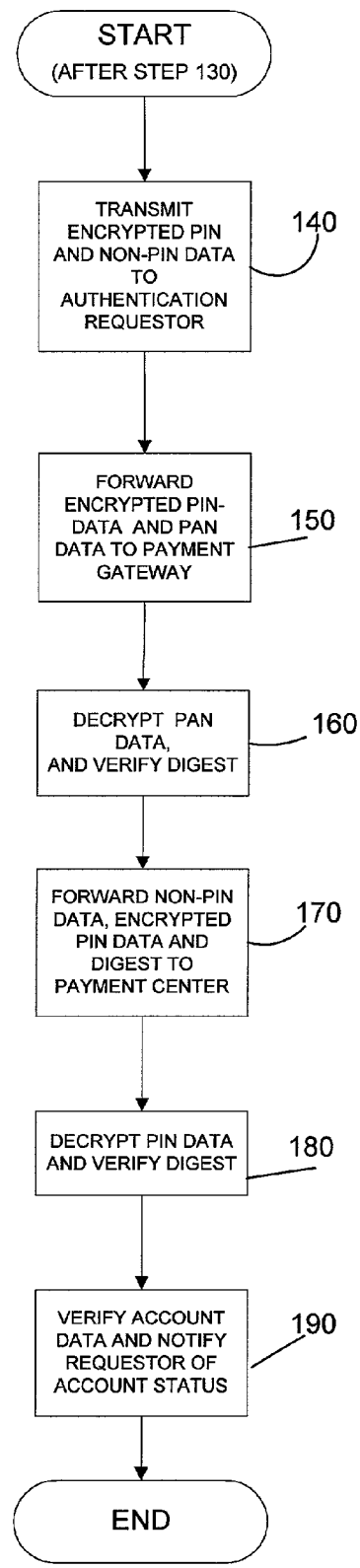
FIG. 1B is in a flow chart illustrating a method of transmitting and verifying encrypted pin data in accordance with the present invention.

It will be appreciated by those skilled in the art that the methods of FIGS. 1A and 1B can be implemented on various standard computer platforms operating under the control of suitable software defined by FIGS. 1A and 1B. In some cases, dedicated computer hardware, such as a peripheral card which resides on the bus of a standard personal computer, may enhance the operational efficiency of the above methods.

Figure 4:
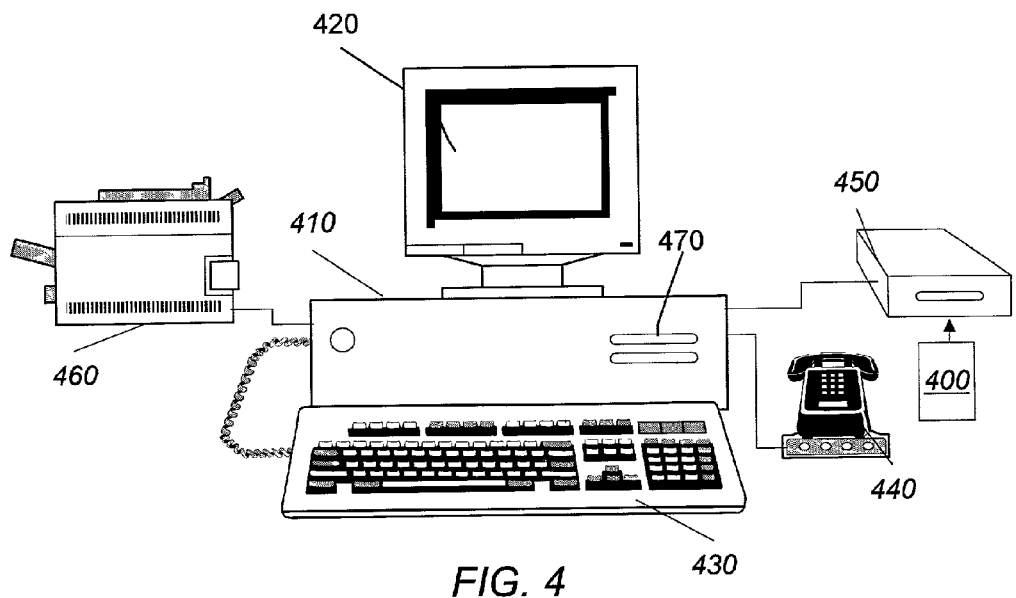
FIG. 4 is a pictorial diagram of a computer system suitable for use in practicing the present invention.
Figure 5:
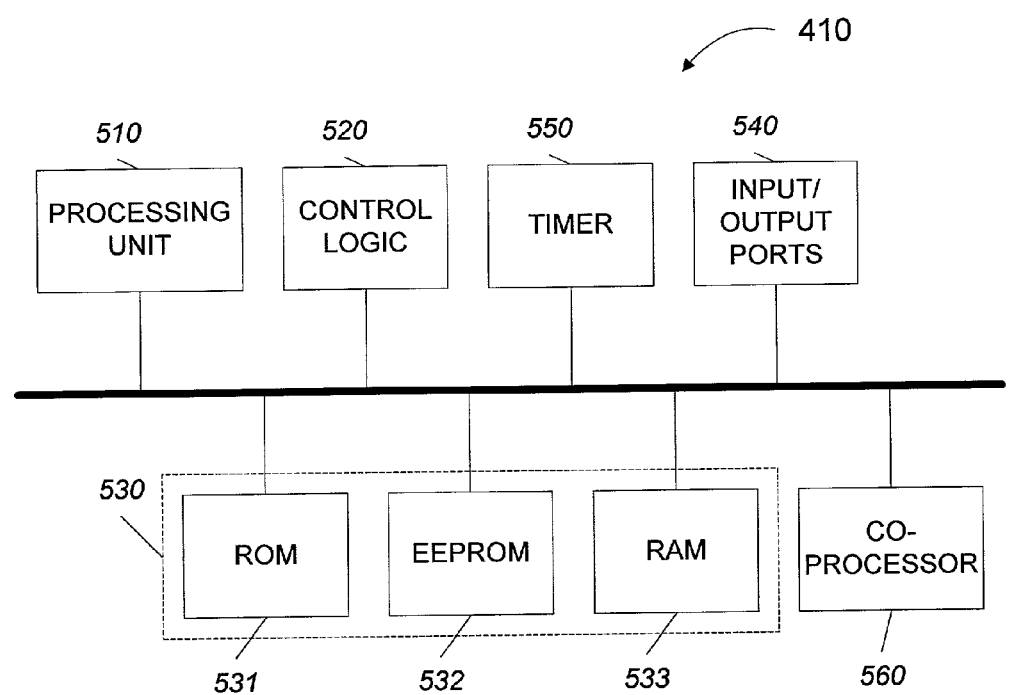
FIG. 5 is a block diagram further illustrating the computer of FIG. 4.

FIGS. 4 and 5 illustrate typical computer hardware suitable for practicing the present invention. Referring to FIG. 4, the computer system includes a computer section 410, a display 420, a keyboard 430, and a communications peripheral device 440, such as a modem. The system may also include other input devices such as a card reader 450 for reading a credit or debit card 400 and a printer 460. The computer system generally includes one or more disk drives 470 which can read and write to computer readable media, such as magnetic media (i.e., diskettes) or optical media (i.e., CD-ROMS) for storing data and application software. While not shown, other input devices, such as digital pointers (e.g., "mouse") and the like may also be included.

FIG. 5 is a functional block diagram which further illustrates the computer section 410. The computer section 410 generally includes a processing unit 510, control logic 520 and a memory unit 530. Preferably, computer section 410 can also include a timer 550 and input/output ports 540. The computer section 410 can also include a co-processor 560, depending on the microprocessor used in the processing unit. Control logic 520 provides, in conjunction with processing unit 510, the control necessary to handle communications between memory unit 530 and input/output ports 540. Timer 550 provides a timing reference signal for processing unit 510 and control logic 520. Co-processor 560 provides an enhanced ability to perform complex computations in real time, such as those required by cryptographic algorithms.

Memory unit 530 may include different types of memory, such as volatile and non-volatile memory and read-only and programmable memory. For example, as shown in FIG. 5, memory unit 530 may include read-only memory (ROM) 531, electrically erasable programmable read-only memory (EEPROM) 532, and random-access memory (RAM) 535. Different computer processors, memory configurations, data structures and the like can be used to practice the present invention, and the invention is not limited to a specific platform.

The present techniques can be deployed in all situations where a personal identification number is requested from a party at a device not controlled by the PIN issuer and where the PIN is not to be revealed to the requestor of authentication (such as the merchant site or authenticating service). The present invention will be further explained with reference to FIGS. 1A, 1B, and 3B, which illustrates an exemplary interrelationship among parties involved in the practice of the present invention. The parties involved in this exemplary system can include a customer, which is an account holder 300, a merchant or authentication requestor 310, a payment gateway 315 and an authorizing agency 320. The account holder 300, authentication requestor 310 and payment gateway 315 are interconnected by an electronic network 330, which can take the form of either an open network (such as the Internet) or a private network (such as an ATM network). The nature of the electronic network 330 is not critical, and can take various forms including wired and wireless networks, open and closed networks, Internet protocol (IP) and non-IP protocol networks and various combinations of these solutions. The payment gateway 315 is preferably connected to an authorizing agent 320 through a secure private network 318. Alternatively, the payment gateway 315 and authorizing agent 320 can be embodied in the same device or can be collocated.

The account holder 300 is a party who desires to transfer funds from an account, such as a credit card or debit card account or to transfer electronic cash. Typically the hardware used to implement the present invention for the account holder 300 will take the form of a conventional personal computer or other PIN accepting device with suitable communications peripherals to establish a connection on the electronic network 330. The exemplary computer system illustrated in FIGS. 4 and 5 is suitable for this purpose. The account holder 300 is generally provided access to a public key which is used to encrypt the PIN data blocks (step 110) as well as the symmetric key, which is used to establish the encrypted envelope 200 (step 120). The symmetric key can take the form of a self-created symmetric key which is created by the sender, in a manner known in the encryption art. In those cases where the symmetric key is to be encrypted and forwarded along with the data envelope 200, the account holder is also provided with the public key used to encrypt the symmetric key (step 130).

The authentication requestor 310 can be a merchant who is offering goods or services for sale to the account holder 300. The hardware used by the authentication requestor 310 can be, for example, a personal computer, general purpose mainframe computer system, dedicated point-of-sale system, and the like. The selected system includes suitable peripherals to establish a connection to the electronic network 330, as shown generally in FIGS. 4 and 5. In response to an order from the account holder 300, the authentication requester 310 receives the order information as well as an encrypted envelope 200 (in one embodiment) from the account holder 310 (step 140). If the order information needs to be protected, this information can be encrypted by the customer 300 using a public key provided by the merchant 310. The authentication requestor 310 then maintains the private key required to decrypt the order information for processing. However, the authentication requestor 310 is not provided the private key which is required to open the encrypted envelope 200 or decode the PIN data blocks 220. Therefore, the authentication requestor forwards the encrypted envelope 200 with PIN data blocks 220 to the payment gateway 315 which maintains the key to open the encrypted envelope 200 (step 150). This can be either the DES key itself or the private key used to decrypt the encrypted DES key, which was appended to the encrypted envelope 200. This relationship is depicted in FIG. 3C, which illustrates the encrypted PIN data passing through the merchant 312 without being decoded.

The payment gateway 315 preferably decrypts the envelope 200 to reveal the clear PAN data (step 160) and encrypted PIN data blocks 220. Preferably, the payment gateway 315 forwards the encrypted PIN data and decrypted non-PIN data over to a private network 318 to the payment center 320 for verification and approval (step 170). Alternatively, the payment gateway 315 can also be provided the private key for the PIN data blocks 220 and perform the PIN data block decryption as well. In either case, it is preferable that the payment gateway 315 verifies the encrypted digest including the PAN which is appended to the PIN data (step 160).

The payment center 320 is either the party issuing the selected account or an agent of such party (or system of association such as MasterCard®) (i.e., authorized payment processing center) who is provided with the private key required to decrypt the PIN data blocks 220. The payment center 320 will generally implement the present invention on a computer system which is connected to the payment gateway 315 via a secure private network 318 (or is coresident with it). FIGS. 4 and 5 generally illustrate computer hardware suitable for this part of the system. Upon receipt of the encrypted PIN data, the payment center 320 decrypts the PIN data blocks 220 using the appropriate private key (step 180). If a digest is included, the digest is verified by performing the same algorithm (i.e., a hash algorithm) on the decrypted PAN data as was used to generate the original digest. The resultant digest is compared against the received digest, to ensure that the PIN data corresponds to the received PAN data and that the PAN data has not been tampered with (step 180). The PIN data blocks are then verified with the account information (step 190). The authorizing agency 320 then provides a signal to the authentication requestor 310 indicating whether the requested transaction is approved or denied. If the transaction is denied, further information may be provided indicating the reason for denial, i.e., incorrect PIN, insufficiency of funds, etc. In this manner, the authentication requestor 310 receives the required approval without ever being provided with the decrypted PIN data blocks.

Figure 3A:
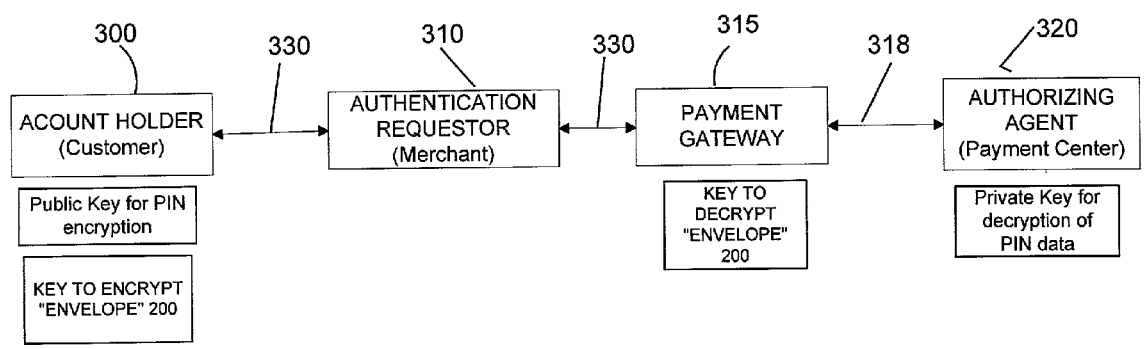
FIG. 3A is a simplified, system level block diagram depicting exemplary parties involved in a secure electronic transaction in accordance with the present invention.
Figure 3B:
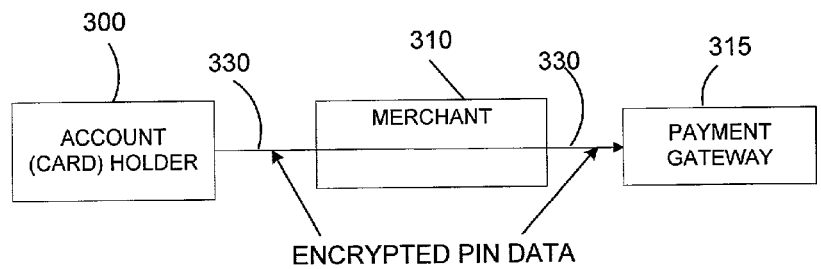
FIG. 3B is a portion of the block diagram of FIG. 3A, illustrating the passing of encrypted PIN data from a customer, through a merchant and to a payment gateway.

FIGS. 3A and 3B illustrate an example where the account holder 300 is performing an electronic transaction remote from the location of the authentication requestor 310, such as over the Internet. However, the present invention is also applicable where a debit card or other account instrument is used at a conventional point-of-sale location, such as a retail store. In this environment, the authentication requestor 310 is provided with a PIN input device (not shown), such as a computer terminal having a suitable keypad, which receives the public key required to encrypt the PIN data blocks. The account holder 310 secretly enters the PIN into the input device located at the point-of-sale which performs the requisite encryption of the PIN block data. Once the PIN data is encrypted, the operation between the authentication requestor 310 and payment center 320 is the same as described in connection with FIG. 3.

The present invention provides a methodology which is particularly well suited for transporting PINs in an open environment like the Internet, using the SET™ (secure electronic transaction) protocol. However, these techniques can also be used to carry PINs in closed or private line environments, such as ATMs or point-of-sale PIN entry devices, where there is no prearranged existing third-party relationship prior to the transaction.

From the foregoing, it is apparent that it is advantageous to separately encrypt the PIN and PIN-related data with an asymmetric key so that only approved authorizing agencies, such as payment processing centers, will be able to decrypt the PIN and process the PIN information. The authorizing agencies, such as entities involved with MasterCard® or other trust providers, distribute their public key to merchants (i.e., authentication requestor) and customers (i.e., account holder) so that the end customer can confidently encrypt PIN data with the public key of a trusted payment processing center.

Although the present invention has been described in connection with specific exemplary embodiments, it should be understood that various changes, substitutions and alterations can be made to the disclosed embodiments without departing from the spirit and scope of the invention as set forth in the appended claims.

What is claimed is:

1. A method for securely transmitting transaction data over a network having at least a public component, the transaction data including account PIN data and non-PIN data, the method comprising:

performing a first encryption operation only on the PIN data; and performing a second encryption operation on at least the non-PIN data, such that the PIN data is cryptographically isolated from the non-PIN data; and transmitting the cryptographically isolated PIN data and non-PIN data over the network to a remote location having only the capability to decode the second encryption operation, wherein said first encryption operation uses an asymmetrical encryption process and said second encryption operation uses a symmetrical encryption process.

2. The method of encoding transaction data of claim 1, wherein said symmetrical encryption process uses a secret encryption key and wherein said method includes the further step of performing a third encryption operation on said secret encryption key.

3. The method of encoding transaction data of claim 1, wherein said second encryption process is performed on both the PIN and non-PIN data, such that the encrypted PIN data resides within an encrypted envelope generated by the second encryption operation.

4. The method of encoding transaction data of claim 1, further comprising the steps of:

calculating a digest by applying a one-way mathematical process to the non-PIN data; and appending the digest to the PIN data blocks for future verification of the non-PIN data.

5. A method for decoding encrypted transaction data, the transaction data including account PIN data input by a user as well as non-PIN data comprising the steps:

receiving the encrypted transaction data from a first remote location over a network having at least a public component;

performing at the first remote location a first decryption operation to decode only the encrypted non-PIN data;

transmitting at least the encrypted account PIN data to a second remote location; and performing at the second remote location a second decryption operation to decode the encrypted account PIN data, wherein said second decryption operation is different from the first decryption operation wherein said first decryption operation uses a symmetrical decryption process and said second decryption operation uses an asymmetrical decryption process.

6. The method of decoding encrypted transaction data of claim 5, further comprising the steps:

calculating a digest by applying a one-way mathematical process to the non-PIN data; and comparing the calculated digest to a received digest formed with the same one-way mathematical process and appended to the PIN data blocks for verifying the non-PIN data.

7. A method of transporting PIN data input by a user and non-PIN data in a secure electronic transfer, comprising the steps:

encrypting only the PIN data using a first encryption process, encrypting at least the non-PIN data using a second encryption process;

transmitting the encrypted PIN and non-PIN data over a data network to an authentication requestor at a remote location, said authentication requestor having means to decrypt only the non-PIN data;

transmitting the encrypted PIN data over a data network to an authorizing agent for verification;

decrypting and verifying the PIN data by the authorizing agent; and transmitting a notification over a data network, from the authorizing agent to the authentication requester, of a verification status of the PIN data,
wherein said first encryption process is an asymmetrical encryption process and said second encryption process is a symmetrical encryption process.

8. The method of transporting PIN and non-PIN data of claim 7, wherein the asymmetrical encryption process is performed using a public key provided to an account holder by the authorizing agent and wherein said decrypting performed by the authorizing agent is performed using a private key associated with the public key.

9. The method of transporting PIN and non-PIN data of claim 8, wherein said symmetrical encryption process uses a secret encryption key and wherein said method includes the further step of performing a third encryption operation on said secret encryption key.

10. The method of transporting PIN and non-PIN data of claim 7, further comprising the steps of:
   prior to transmitting the encrypted PIN and non-PIN data, calculating a first digest by applying a one-way mathematical process to the non-PIN data and appending the digest to the PIN data blocks; and
   after transmitting the encrypted PIN and non-PIN data, calculating a second digest by applying the same one-way mathematical process to the non-PIN data and comparing the first digest and second digest to verify the non-PIN data.

11. A terminal for encoding transaction data including account PIN data input by a user as well as non-PIN data, comprising:
   means for performing a first encryption operation only on the PIN data; and
   means for performing a second encryption operation on at least the non-PIN data, such that the PIN data is cryptographically isolated from the non-PIN data;
   means for transmitting the cryptographically isolated PIN data and non-PIN data over a data network to a remote location;
   transmitting the cryptographically isolated PIN data and non-PIN data over the network to a remote location having only the capability to decode the second encryption operation, wherein said first encryption means uses an asymmetrical encryption process and said second encryption means uses a symmetrical encryption process.

12. The terminal for encoding transaction data of claim 11, further comprising a card reader for acquiring at least a portion of the transaction data from a payment instrument.

13. A system for decoding encrypted transaction data including account PIN data input by a user as well as non-PIN data, comprising:
   means for receiving the encrypted transaction data from a remote location;
   means for performing a first decryption operation to decode the encrypted non-PIN data; and
   means for transmitting at least the encrypted account PIN data to a second remote location; and
   means for performing at the second remote location a second decryption operation to decode the encrypted account PIN data, wherein said second decryption operation is different from the first decryption operation, wherein said first decryption means uses a symmetrical decryption process and said second decryption means uses an asymmetrical decryption process.

14. A system for encoding and transporting PIN data input by a user and non-PIN data comprising:
   first means for encrypting only the PIN data using a first encryption process;
   second means for encrypting at least the non-PIN data using a second encryption process;
   means for transmitting the encrypted PIN and non-PIN data over a data network to an authentication requestor, said authentication requestor having means to decrypt only the non-PIN data;
   means for transmitting the encrypted PIN data over a data network to an authorizing agent for verification;
   means for decrypting and verifying the PIN data by the authorizing agent; and
   means for notifying the authentication requestor over a data network of a verification status of the PIN data, wherein
   said first encryption means employs an asymmetrical encryption process and, wherein
   said second encryption means employs a symmetrical encryption process.

15. The system for encoding and transporting PIN and non-PIN data of claim 14, wherein the first encryption means uses a public key provided to an account holder by the authorizing agent and wherein said decrypting means uses a private key associated with the public key.

16. The system for encoding and transporting PIN and non-PIN data of claim 14, further comprising:
   means for calculating a first digest by applying a one-way mathematical process to the non-PIN data and appending the digest to the PIN data blocks prior to transmitting the encrypted PIN and non-PIN data; and
   means for calculating a second digest by applying the same one-way mathematical process to the non-PIN data and comparing the first digest and second digest after transmitting the encrypted PIN and non-PIN data, to verify the non-PIN data.

17. The system for encoding and transporting PIN and non-PIN data of claim 14, further comprising a card reader for acquiring at least a portion of the PIN and non-PIN data from a payment instrument.

18. A method for decoding encrypted transaction data, the transaction data including encrypted account PIN data encrypted by a first encryption operation as well as encrypted non-PIN data encrypted with a second different encryption operation, comprising the steps:
   receiving the transaction data from a remote location over a network having at least a public component, wherein said remote location does not have the capability to decode the encrypted PIN data;
   performing a first decryption operation to decode the encrypted non-PIN data; and
   transmitting at least said encrypted PIN data to another remote location for a second decryption operation, wherein: said first decryption operation uses a symmetrical decryption process and said second decryption operation uses an asymmetrical decryption process.

* * * * *